United States Patent
Tran

(10) Patent No.: US 11,809,677 B2
(45) Date of Patent: Nov. 7, 2023

(54) SYSTEM AND METHOD FOR ENABLING CONTROL OF CURSOR MOVEMENT ON AN ASSOCIATED LARGE SCREEN USING DYNAMIC GRID DENSITY OF AN ASSOCIATED MOBILE DEVICE

(71) Applicant: PEER INC, Bellevue, WA (US)

(72) Inventor: Thinh Tran, Bellevue, WA (US)

(73) Assignee: PEER INC, Bellevue, WA (US)

( * ) Notice: Subject to any disclaimer, the term of this patent is extended or adjusted under 35 U.S.C. 154(b) by 0 days.

(21) Appl. No.: 18/068,432

(22) Filed: Dec. 19, 2022

(65) Prior Publication Data

US 2023/0205388 A1 Jun. 29, 2023

Related U.S. Application Data

(60) Provisional application No. 63/294,336, filed on Dec. 28, 2021.

(51) Int. Cl.
*G06F 3/04812* (2022.01)
*G06F 3/04883* (2022.01)

(52) U.S. Cl.
CPC ...... *G06F 3/04812* (2013.01); *G06F 3/04883* (2013.01)

(58) Field of Classification Search
CPC .......... G06F 3/04812; G06F 3/04883
See application file for complete search history.

(56) References Cited

U.S. PATENT DOCUMENTS

| 10,747,414 | B2 | 8/2020 | Tran | |
| 11,675,454 | B2* | 6/2023 | Hotelling | G06F 3/047 345/174 |
| 2011/0134030 | A1* | 6/2011 | Cho | G06F 3/038 345/157 |
| 2011/0267291 | A1* | 11/2011 | Choi | H04N 21/4222 345/173 |
| 2012/0146901 | A1* | 6/2012 | Ujiie | G06F 3/0346 345/157 |
| 2018/0329605 | A1* | 11/2018 | Venkateswararao | G06F 9/451 |
| 2019/0171354 | A1 | 6/2019 | Dascola et al. | |
| 2022/0394346 | A1* | 12/2022 | Tan-Ang | H04N 21/2187 |

* cited by examiner

*Primary Examiner* — Tadesse Hailu
(74) *Attorney, Agent, or Firm* — SEED INTELLECTUAL PROPERTY LAW GROUP LLP

(57) ABSTRACT

A system for controlling cursor movement on an associated large display device using dynamic grid density. The system includes a personal mobile computing device and a remote server. The personal mobile computing device receives input from the user, via a touch screen, to control cursor movement on the associated large display device. The touch screen includes a grid that increases in density towards the edges of the touch screen. The personal mobile computing device sends the user input to the remote server. The remote server calculates corresponding cursor movement on the associated large display device. The dynamic grid density on the touch screen controls how far the cursor on the associated large display device moves in response to the user input on the touch screen. The remote server then send instructions to move the cursor on the associated large display device using to the calculated corresponding cursor movement.

20 Claims, 9 Drawing Sheets

SYSTEM AND METHOD FOR ENABLING CONTROL OF CURSOR MOVEMENT ON AN ASSOCIATED LARGE SCREEN USING DYNAMIC GRID DENSITY OF AN ASSOCIATED MOBILE DEVICE

TECHNICAL FIELD

The present application pertains to controlling cursor movement, and more particularly, to controlling cursor movement on an associated large screen using dynamic grid density of an associated mobile device.

BACKGROUND

Description of the Related Art

User input devices have changed little over the past few decades. User input devices typically include a mouse, track balls, keyboards, joy sticks, and the like. Touch screens are also useful user input devices, but they have many limitations. For example, a standard touch screen is dramatically more expensive than a standard display only screen. Additionally, touch screens tend to be limited in the size in which they can be produced. Moreover, there can be significant limitations in the accuracy and latency of a touch screen when the screens become larger in size.

Also, difficulties can be encountered when a user wants to use a display screen with which there is not a preexisting relationship. Establishing a link between a user input device and a display screen sometime has challenges if the display screen is not natively linked with the user input device. Additionally, if the display screen is natively linked with the user input device, but the user input device is used by the public in general or at least numerous individuals, then the functionality of the user input device may be less than desirable due to wear and tear on the user input device.

Furthermore, there is also a desire among users to interact with information that is presented on larger display screens. Traditional means of interacting with such larger screens have proved unsatisfactory, particularly when the larger display screens do not have a previous secured information transfer link with a user input device. The present disclosure addresses this and other needs.

BRIEF SUMMARY

Briefly stated, embodiments of the present disclosure are directed towards systems for controlling cursor movement on an associated large display device using dynamic grid density of an associated personal mobile computing device. Such systems include a personal mobile computing device and a remote server. The personal mobile computing device stores authentication information, and includes a touch screen, a device memory that stores device computer instructions, and a device processor. The device processor executes the device computer instructions and causes the personal mobile computing device to: determine when the personal mobile computing device is within range of the associated large display device; coordinate authentication between the personal mobile computing device and a server; receive input from the user, via the touch screen of the personal mobile computing device, to control cursor movement on the associated large display device, the touch screen including a grid that increases in density towards the edges of the touch screen; and send the user input to a remote server that controls cursor movement on the associated large display device.

The remote server includes a server memory that stores server computer instructions and a server processor that when executing the server computer instructions causes the remote server to: calculate corresponding cursor movement on the associated large display device using dynamic grid density on the touch screen of the personal mobile computing device that increases in density as the user moves its input device towards an edge of the touch screen, wherein the dynamic grid density on the personal mobile computing device controls how far the cursor on the associated large display device moves in response to the user input on the touch screen of the personal mobile computing device; and send instructions to move the cursor on the associated large display device relative to the calculated corresponding cursor movement, wherein the corresponding cursor movement is calculated using the dynamic grid density without using a screen size of the associated large display device in the calculation.

In some embodiments, the larger associated larger display devices have a higher dynamic grid density toward edges of their touch screens than smaller associated large display devices. In other embodiments, the smaller associated large display devices have a lower dynamic grid density toward edges of their touch screens than larger associated large display devices. In another aspect of some embodiments, the user's input device is one of a finger, a stylus, or a digital pen. In still another aspect of some embodiments, the touch screen has four edges and the dynamic grid density increases from a center of the touch screen towards any of the four edges. In yet another aspect of some embodiments, the touch screen has four edges and the dynamic grid density increases from a center of the touch screen towards only two of the four edges.

In one or more other embodiments, the dynamic grid density increases geometrically from a center of the touch screen towards an edge of the touch screen. In another aspect of some embodiments, the dynamic grid density increases exponentially from a center of the touch screen towards an edge of the touch screen. In still another aspect of some embodiments, the received input from the user is sent from the personal mobile computing device to the server where the input is processed in association with the dynamic grid density. In yet another aspect of some embodiments, the instructions to move the cursor on the associated large display device relative to the calculated corresponding cursor movement are sent from the server to the associated large display device.

Embodiments of the present disclosure are also directed towards methods for controlling cursor movement on an associated large display device using dynamic grid density of an associated personal mobile computing device. Such methods include: accessing a personal mobile computing device that stores authentication information, the personal mobile computing device including a touch screen, a device memory that stores device computer instructions, and a device processor; receiving input from the user, via the touch screen of the personal mobile computing device, to control cursor movement on the associated large display device, the touch screen including a grid that increases in density towards the edges of the touch screen; sending the user input to a remote server that controls cursor movement on the associated large display device; calculating, using the remote server, corresponding cursor movement on the associated large display device using dynamic grid density on the touch screen of the personal mobile computing device that increases in density as the user moves its input device towards an edge of the touch screen, wherein the dynamic grid density on the personal mobile computing device controls how far the cursor on the associated large display device moves in response to the user input on the touch screen of the personal mobile computing device; and sending instructions from the remote server to the associated large display device to move the cursor on the associated large display device relative to the calculated corresponding cursor movement, wherein the corresponding cursor movement is calculated using the dynamic grid density without using a screen size of the associated large display device in the calculation.

In some embodiments of this method, the larger associated larger display devices have a higher dynamic grid density toward edges of their touch screens than smaller associated large display devices. In other embodiments of this method, the smaller associated large display devices have a lower dynamic grid density toward edges of their touch screens than larger associated large display devices. In another aspect of some embodiments of this method, the user's input device is one of a finger, a stylus, or a digital pen. In still another aspect of some embodiments of this method, the touch screen has four edges and the dynamic grid density increases from a center of the touch screen towards any of the four edges. In yet another aspect of some embodiments of this method, the touch screen has four edges and the dynamic grid density increases from a center of the touch screen towards only two of the four edges.

In one or more other embodiments of this method, the dynamic grid density increases geometrically from a center of the touch screen towards an edge of the touch screen. In another aspect of some embodiments of this method, the dynamic grid density increases exponentially from a center of the touch screen towards an edge of the touch screen. In still another aspect of some embodiments of this method, the received input from the user is sent from the personal mobile computing device to the server where the input is processed in association with the dynamic grid density. In yet another aspect of some embodiments of this method, the instructions to move the cursor on the associated large display device relative to the calculated corresponding cursor movement are sent from the server to the associated large display device.

Still other embodiments of the present disclosure are directed towards systems for controlling cursor movement on an associated large display device using dynamic grid density of an associated personal mobile computing device. Such systems include a personal mobile computing device and a remote server. The personal mobile computing device stores authentication information, and includes a touch screen, a device memory that stores device computer instructions, and a device processor. The device processor executes the device computer instructions and causes the personal mobile computing device to:

receive input from the user, via the touch screen of the personal mobile computing device, to control cursor movement on the associated large display device, the touch screen including a grid that increases in density towards the edges of the touch screen; and send the user input to a remote server that controls cursor movement on the associated large display device.

The remote server includes a server memory that stores server computer instructions and a server processor that, when executing the server computer instructions, causes the remote server to: calculate corresponding cursor movement on the associated large display device using dynamic grid density on the touch screen of the personal mobile computing device that increases in density as the user moves its input device towards an edge of the touch screen, wherein the dynamic grid density on the personal mobile computing device controls how far the cursor on the associated large display device moves in response to the user input on the touch screen of the personal mobile computing device; and send instructions to move the cursor on the associated large display device relative to the calculated corresponding cursor movement, wherein the corresponding cursor movement is calculated using the dynamic grid density without using a screen size of the associated large display device in the calculation.

The embodiments described in the present disclosure improve upon known data storage architectures, structures, processes, and techniques in a variety of different computerized technologies, such as operating systems, user interfaces, and social networks.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
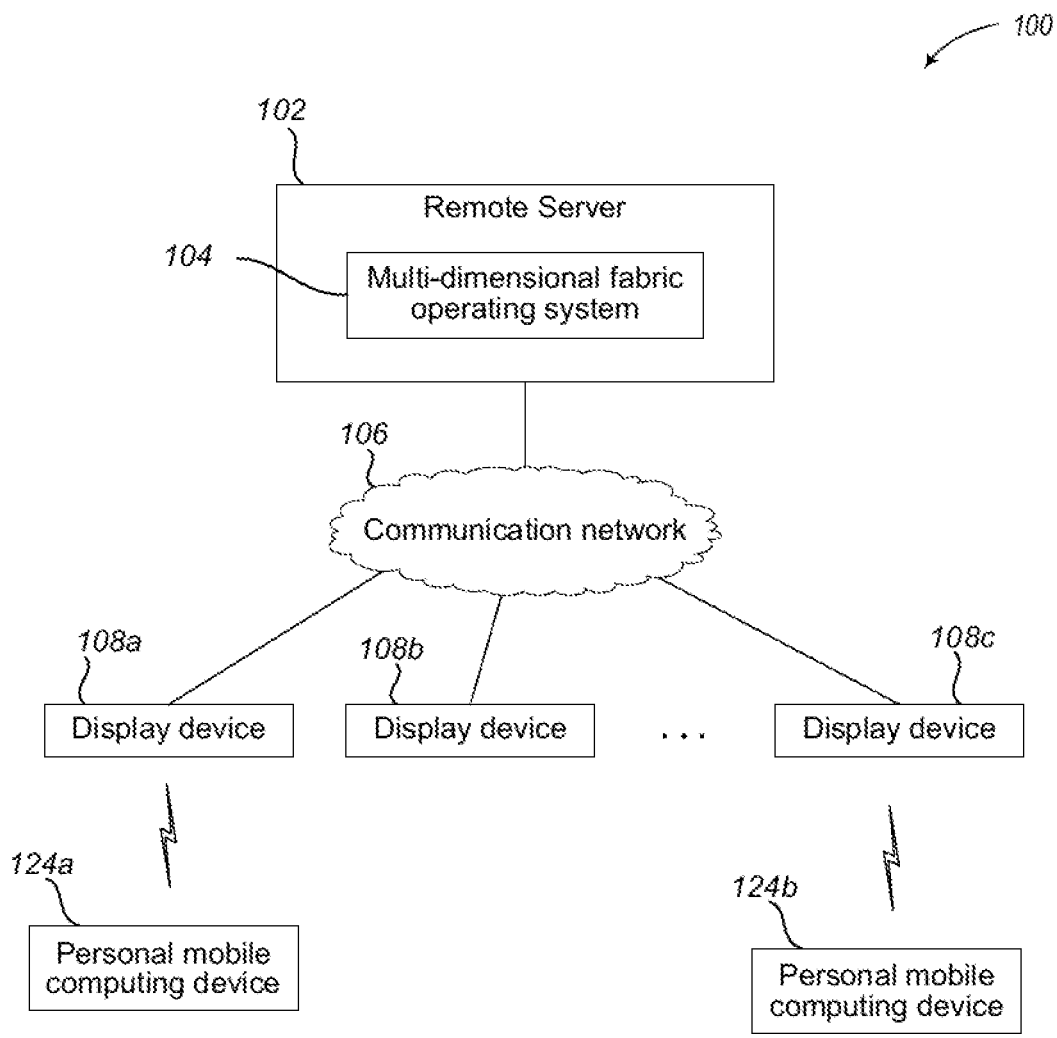
FIG. 1 illustrates a context diagram of an environment that provides a user interface for moving a cursor on an associated large display device in accordance with embodiments described herein.

FIG. 1 illustrates a context diagram of an environment 100 that provides a multi-dimensional fabric user interface for storing content in accordance with embodiments described herein. In the illustrated example, environment 100 includes a remote server 102, one or more display devices 108a-108c, and one or more personal mobile computing devices 124a, 124b.

The remote server 102 in the system is configured as a remote computing system, e.g., cloud computing resources, which implements or executes a multi-dimensional fabric operating system 104. In various embodiments, a separate instance of the multi-dimensional fabric operating system 104 is maintained and executing for each separate personal mobile computing device 124a, 124b. In some embodiments, the multi-dimensional fabric user interface may be implemented as an operating shell.

Although not illustrated, the remote server 102 may also be running various programs that are accessible to the users of the personal mobile computing devices 124a, 124b via the multi-dimensional fabric operating system 104. Accordingly, the environment and system described herein make it possible for a plurality of applications to be run in the cloud, and a user accesses a particular application by moving the fabric to that application's coordinates.

The multi-dimensional fabric operating system 104 stores content according to a plurality of different dimensions. In some embodiments, the content is stored based on when the content was captured by the user or when it was stored by the remote server 102 (e.g., a time stamp added to a picture when the picture was captured or a time stamp when the picture was uploaded to the remote server), where the content was captured by the user (e.g., the location of the camera that captured the picture or location of a display device used to upload the picture from the camera to the remote server), and what the content is about (e.g., food, clothing, entertainment, transportation, etc.).

A user in the system can access the multi-dimensional fabric operating system 104 via a display device 108a. The user has a personal mobile computing device 124, which can create or obtain content. The user can walk up to or approach a display device 108. The display device 108 coordinates authentication of the personal mobile computing device 124 with the remote server 102. The user can then use the display device 108 as a personal computer to upload content from the personal mobile computing device 124 to the remote server 102 using the multi-dimensional fabric operating system 104. Similarly, the user can use the display device 108 to access content previously stored by the multi-dimensional fabric operating system 104. For example, the user can use hand gestures, or touch interfaces, to provide input that manipulates a user interface displayed on the display device 108, where the user interface is generated by the multi-dimensional fabric operating system 104. The remote server 102 can respond to the input by providing an updated user interface of the multi-dimensional fabric to the display device 108 for display to the user. Notably, the user may transmit between the personal mobile computing device 124b and the remote server 102 via the communication network 106, without connecting to a display device 108 in some embodiments.

Figure 2:
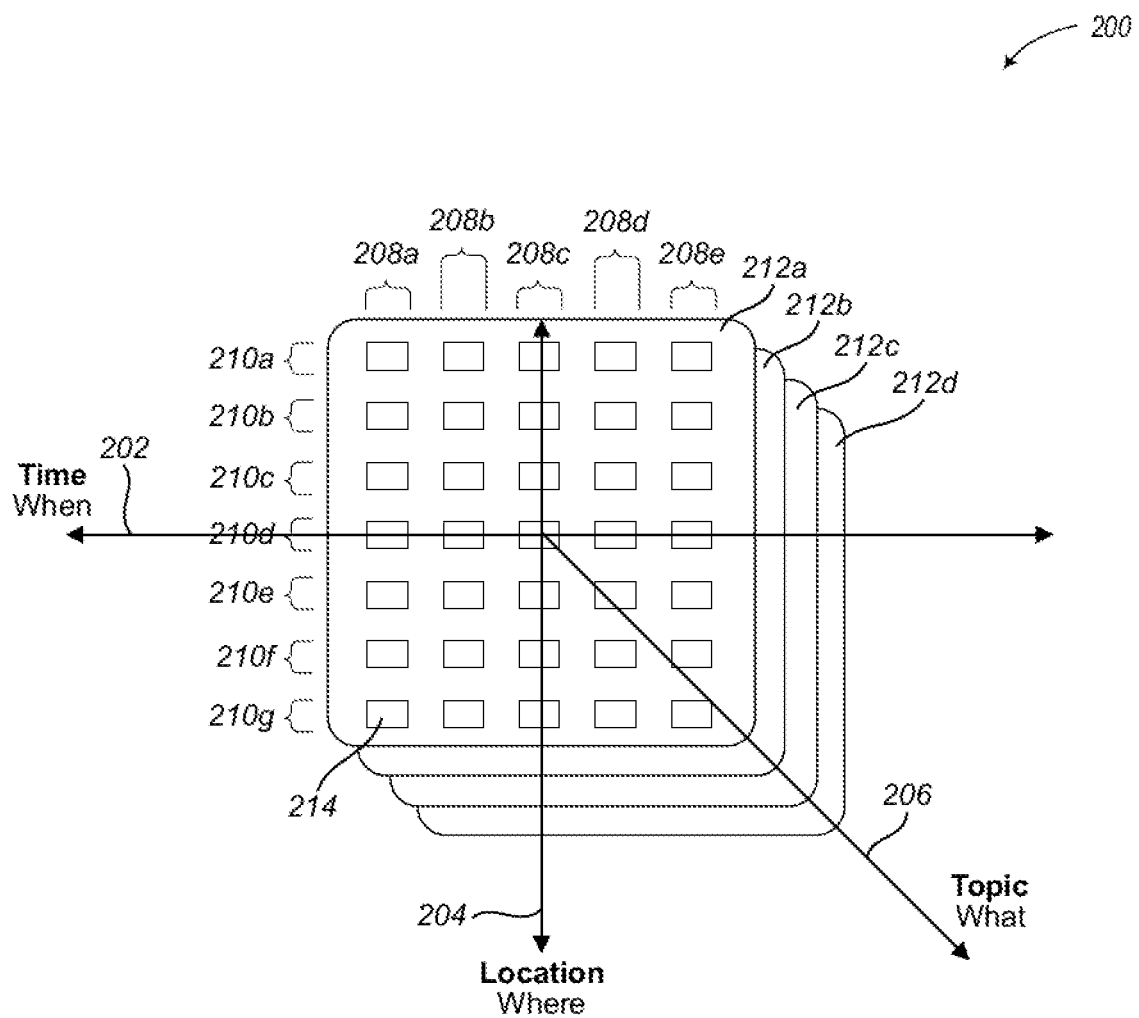
FIG. 2 illustrates a graphical representation in accordance with embodiments described herein.
Figure 3:
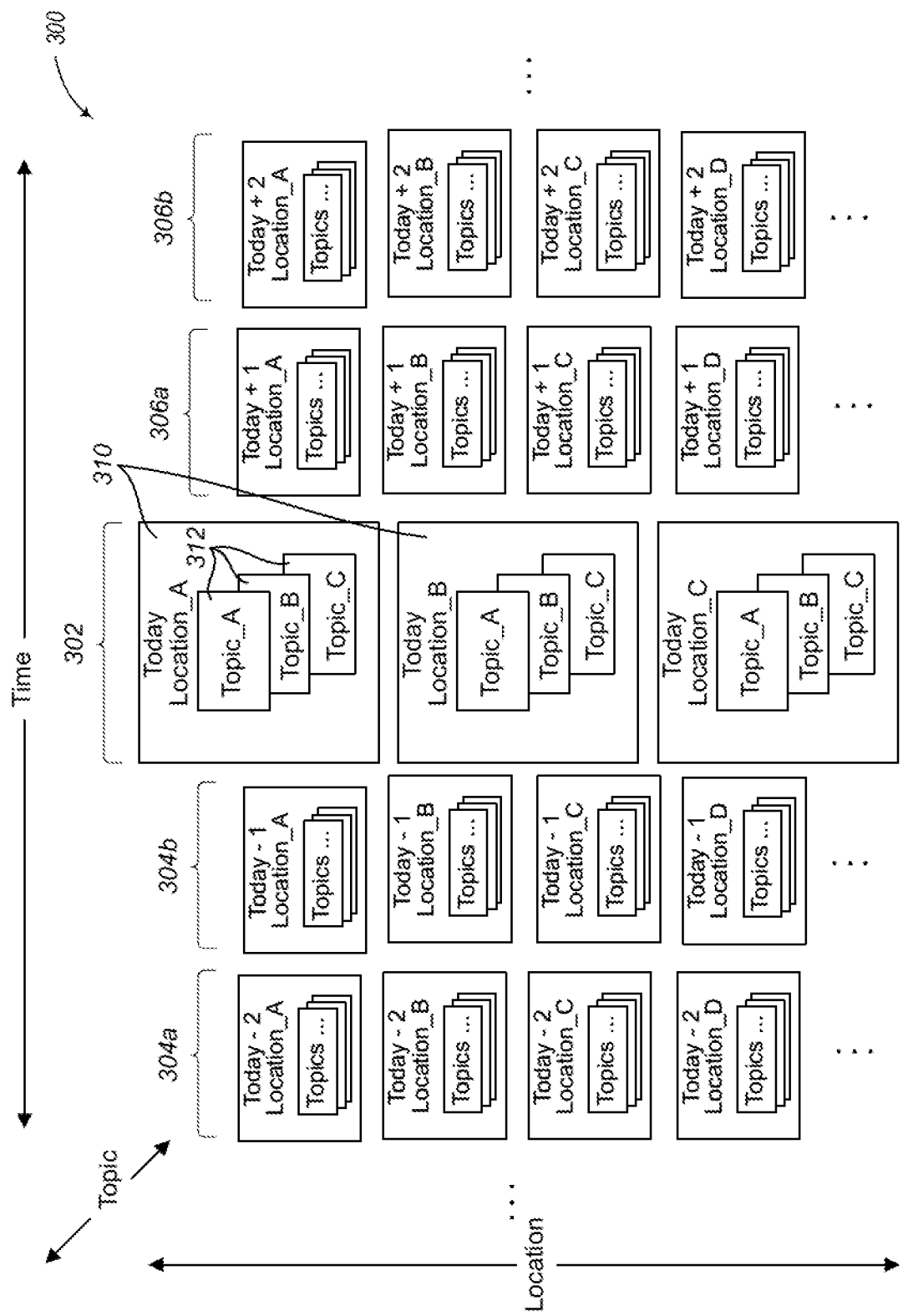
FIG. 3 illustrates another graphical representation in accordance with embodiments described herein.

FIGS. 2 and 3 illustrate graphical representations of use case examples of a multi-dimensional fabric user interface for storing content in accordance with embodiments described herein.

Example fabric 200 in FIG. 2 includes a time axis 202, a location axis 204, and a topic axis 206. Although fabric 200 appears to be constrained in each axis, embodiments are not so limited. Rather, fabric or graphical environment is flexible, while the coordinate is fixed. This allows a user to use cruder movements, like the swipe of an arm, to achieve refined movement to arrive at the content. This also reduces the content footprint because it does not need to manage a file structure, which improves throughput to a degree that it can run entirely in the cloud.

In some embodiments, users in the multi-dimensional fabric system navigate by moving the environment, or fabric, to a specific content or item. The content is placed within a 3-Dimensional structure of Time (when)+Location (where)+Topic (what), which may be in the form of a multi-dimensional coordinate system. By configuring the content in the fabric based on 3 dimensions (What, When, Where), the fabric provides a pre-configured scaffold that allows a user to navigate the plurality of content without the multi-dimensional fabric system fetching and organizing it. The fabric makes discovering more relevant content immediately accessible.

The time axis 202 in the multi-dimensional fabric system may be arranged as a plurality of different time periods, such as hours or days. In various embodiments, the current time period (e.g., today) is shown in the middle column 208c, which is shown in FIG. 3. The location axis 204 may be arranged as a plurality of different locations. In some embodiments, the content locations are selected based on a distance from a current location of the display device that is accessing the fabric 200. For example, locations closest to the display device are arranged in the top row 210a and the locations furthest from the display device are arranged in the bottom row 210g. Likewise, topics may be arranged based on themes nearest to the display device. For example, food content may be in layer 212a, entertainment content in layer 212b, transportation content in layer 212c, etc. In other embodiments, the topics may be arranged based on frequency of access to the user based on location.

The fabric 200 in the multi-dimensional fabric system illustrates a plurality of icons 214 that each represent separate content (also referred to as content 214). The content 214 is laid out in a plurality of time periods 208a-208e (columns), a plurality of locations 210a-210g (rows), and a plurality of topics 212a-212d (layers), using coordinates associated with the separate dimensions. For any given point defined by (What, When, Where) there is a finite amount of content or data. As a result, users can simply point out a certain What, When, and Where to know where something is located and can directly access it from that point.

In some embodiments of the multi-dimensional fabric system, the location rows 210, time columns 208, and topic layers may be independent from one another such that a user can manipulate a single axis. In other embodiments, the user can manipulate two or more axes. For example, a user can vertically scroll along the location axis 204 through a single column (e.g., single time period on the time axis), such as column 208c, without affecting the other columns or layers, or the user can vertically scroll along the location axis 204 for multiple columns or multiple layers, or both. Likewise, the user can horizontally scroll along the time axis 202 through a single row (e.g., single location on the location axis), such as row 210d, without affecting the other rows or layers, or the user can horizontally scroll along the time axis 202 for multiple rows or multiple layers, or both. Moreover, the user can depth scroll along the topic axis 206 through a single layer (e.g., single topic on the topic axis), such as layer 212a, without affecting the other rows or columns, or the user can depth scroll along the topic axis 206 for multiple rows or multiple columns, or both.

By providing input to one or more axes in the multi-dimensional fabric system, the user can manipulate or move the fabric 200 to access content for a specific time, a specific location, and a specific topic. The user can scroll on a particular axis by providing one or more hand gestures. For example, a horizontal movement of the user's arm may move the time axis 202, a vertical movement of the user's arm may move the location axis 204, and an in-or-out movement of the user's arm may move the topic axis 206. The user can then select a specific content 214, such as the content in the middle (along time and location axes) and on top (along the topic axis) of the fabric by moving their arm away from the display screen or by making a fist or by opening their hand.

In some embodiments of the multi-dimensional fabric system, the fabric will look two-dimensional to a user, but is actually three-dimensional, such that when a two-dimensional point is selected by the user, the user can switch axes to view the third dimension. And although FIG. 2 shows the time axis 202 and the location axis 204 on this top-level two-dimensional view, other combinations of axes may also be used, e.g., time v. topic, location v. topic, or other non-illustrated axes.

Example fabric 300 in FIG. 3 is similar to fabric 200 in FIG. 2, but is an example of how the fabric 300 can be displayable to a user. In this example illustration in FIG. 3, the current time period 302 is illustrated in a middle column with future time periods 306a, 306b to the right of the current time period 302 and past time periods 304a, 304b to the left of the current time period. Each location 310 in the current time period 302 includes a plurality of topics 312. These topics 312 are similar to the layers 212 in FIG. 2.

Again, the user in the multi-dimensional fabric system can move or manipulate the fabric 300 along one or more axes to select a particular piece of content. Once selected, the particular content is displayed to the user. Various embodiments of the multi-dimensional fabric described herein can be used for a variety of different content storage technologies. One example technology is the fluid timeline social network described in U.S. patent application Ser. No. 16/300,028, filed Nov. 8, 2018, titled FLUID TIMELINE SOCIAL NETWORK, and issued Aug. 18, 2020, as U.S. Pat. No. 10,747,414, which is incorporated herein by reference.

The operation of certain aspects of the disclosure will now be described with respect to FIGS. 4A and 4B. In at least one of various embodiments of the system, process 400 described in conjunction with FIG. 4A may be implemented by or executed by a system of one or more computing devices, such as display device 108 in FIG. 1, and process 500 described in conjunction with FIG. 4B may be implemented by or executed by a system of one or more remote computing devices, such as remote server 102.

Figure 4A:
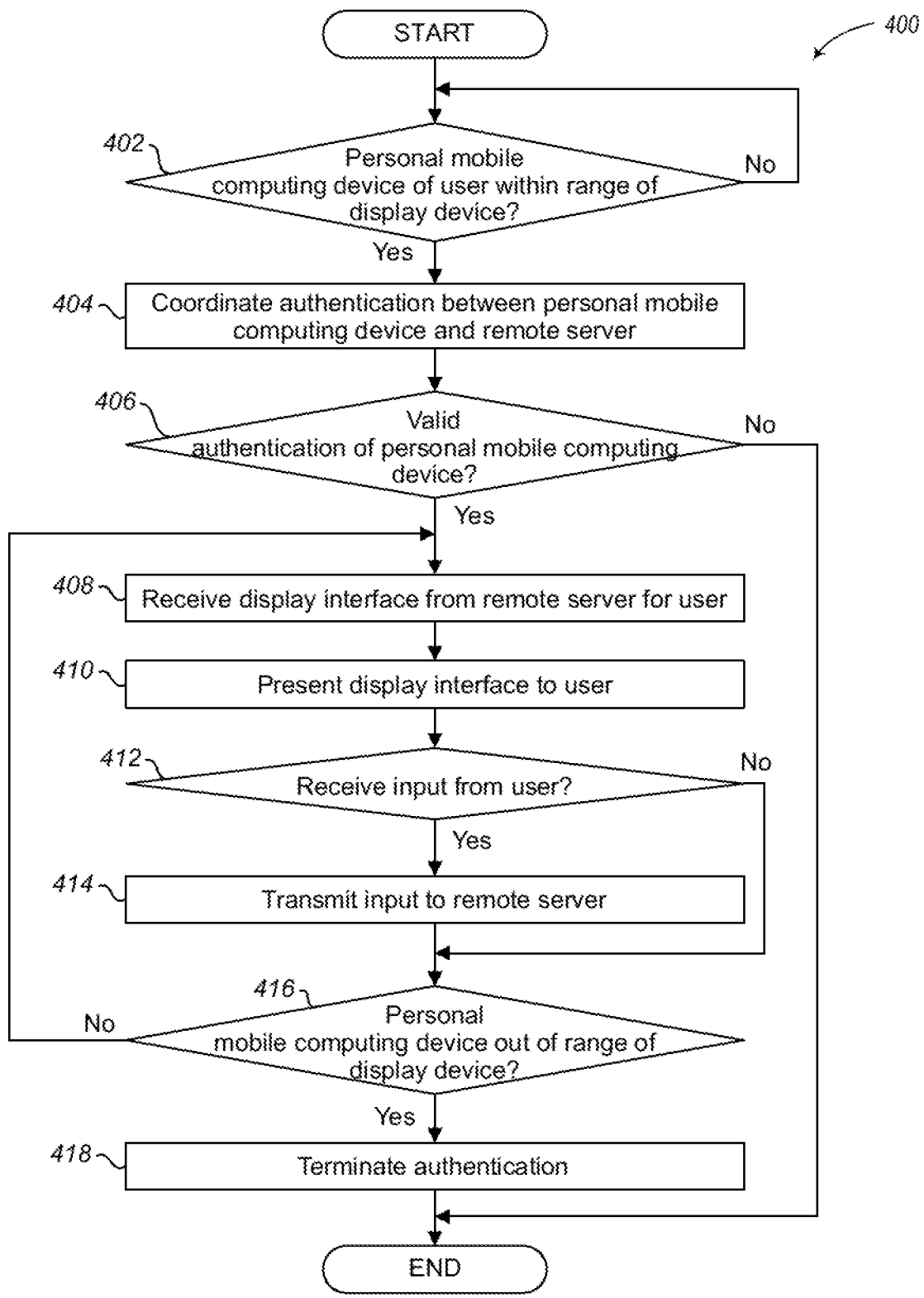
FIG. 4A illustrates a logical flow diagram generally showing one embodiment of a process for accessing a remote server from a display device in accordance with embodiments described herein.

FIG. 4A illustrates a logical flow diagram generally showing one embodiment of a process 400 for accessing a remote server from a display device to present a graphical user interface of a multi-dimensional fabric in accordance with embodiments described herein.

Process 400 begins, after a start block, at decision block 402, where a determination is made whether a personal mobile computing device of a user is within range of the display device. This determination may be made when the personal mobile computing device is within a threshold distance from the display device (e.g., using one or more range detection devices) or when the user indicates or requests to interact with the display device. If the personal mobile computing device is within range of the display device, then process 400 flows to block 404; otherwise process 400 loops to decision block 402 until a personal mobile computing device is within range of the display device.

At block 404, the display device coordinates authentication between the personal mobile computing device and a remote server. This coordination may include obtaining, requesting, or otherwise forwarding authentication keys or other information to determine the validity or authenticity of the personal mobile computing device as being authorized to access the remote server.

Process 400 proceeds to decision block 406, where a determination is made whether the personal mobile computing device is validly authenticated with the remote server. In some embodiments, the remote server may provide a token, session identifier, or other instruction to the display device indicating that the user of the personal mobile computing device is authorized to access the remote server via the display device. If the personal mobile computing device is valid, then process 400 flows to block 408; otherwise, process 400 terminates or otherwise returns to a calling process to perform other actions.

At block 408, the display device receives a display interface from the remote server for the user. In various embodiments, the display interface is customized for the user, such as if the user logged directly onto the remote server to access personal content. As described herein, this display interface is a multi-directional fabric that the user can manipulate, as described herein.

Process 400 continues at block 410, where the display device presents the display interface to the user of the personal mobile computing device. In some embodiments, the display interface is displayed directly by the display device. In other embodiments, the display interface is displayed via the personal mobile computing device.

Process 400 proceeds next to decision block 412, where a determination is made whether the display device has received input from the user. As described herein, the input may be provided via a hand gesture without touching a screen of the display device. Such hand gesture may be a swipe left or right, swipe up or down, or movement towards or away from the screen of the display device. A selection input can then be received if the user rapidly moves their hand away from the screen of the display device or if the user opens or closes his/her hand. If user input is received, then process 400 flows to block 414; otherwise, process 400 flows to decision block 416.

At block 414, the display device transmits the user input to the remote server. Process 400 proceeds to decision block 416, where a determination is made whether the personal mobile computing device is out of range of the display device (e.g., outside of a threshold distance or the user de-activated the session. If not, process 400 loops to block 408 to receive an updated or modified display interface (based on the user input) and present it to the user. If the personal mobile computing device is out of range of the display device, then process 400 flows to block 418 to terminate the authentication with the remote server.

After block 418, process 400 may terminate or otherwise return to a calling process to perform other actions. In some embodiments, process 400 may loop to decision block 402 to wait for another personal mobile computing device to be within range of the display device.

Figure 4B:
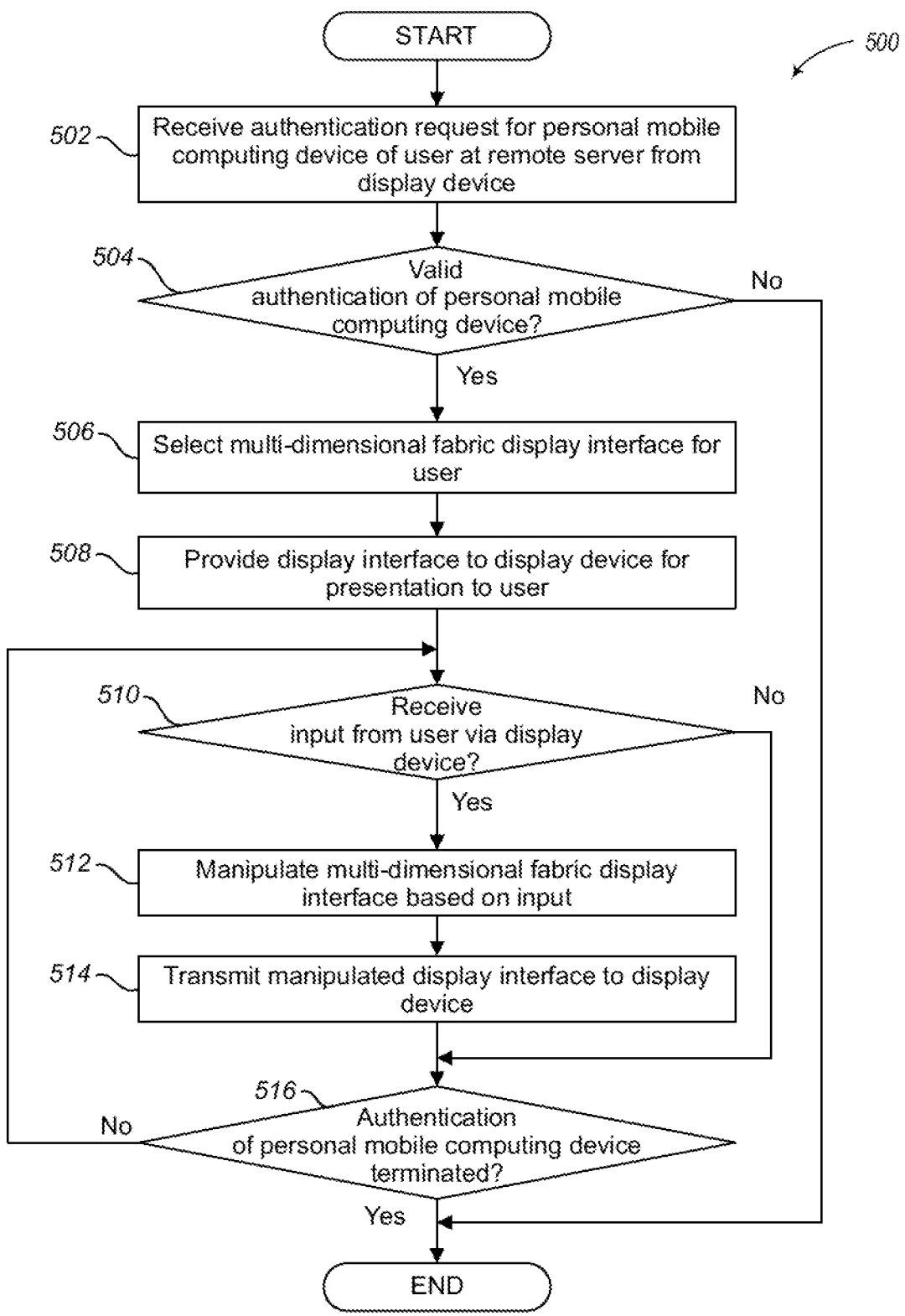
FIG. 4B illustrates a logical flow diagram generally showing one embodiment of a process for moving a cursor on an associated large display device.

FIG. 4B illustrates a logical flow diagram generally showing one embodiment of a process 500 in the system for a remote server to provide a graphical user interface of a multi-dimensional fabric to a display device in accordance with embodiments described herein.

Process 500 begins, after a start block, at block 502, where an authentication request is received at a remote server from a display device for a personal mobile computing device of a user. In some embodiments, the authentication request may include encryption keys, user credentials, or other authentication information.

Process 500 proceeds to decision block 504, where a determination is made whether the personal mobile computing device is validly authenticated or not. If the personal mobile computing device is valid, process 500 flows to block 506; otherwise, process 500 terminates or otherwise returns to a calling process to perform other actions.

At block 500, the remote server selects a multi-dimensional fabric display interface for the user of the personal mobile computing device. In some embodiments, the remote server instantiates or accesses a previously running version of the multi-dimensional fabric operating system for the user. In various embodiments, each separate user (or a group of multiple users) has a corresponding multi-dimensional fabric user interface accessible via the remote server. The multi-dimensional fabric display interfaces with content laid out in a fabric-like structure based on at least time, location, and topic such that the user can manipulate or move the fabric in one or more dimensions to select content.

Process 500 proceeds to block 508, where the remote server provides the selected display interface to the display device for presentation to the user. Process 500 continues at decision block 510, where a determination is made whether user input has been received from the display device. In various embodiments, the input may be a change or selection of one or more dimensions of the fabric or a user selection.

If user input has been received, process 500 flows to block 512; otherwise, process 500 flows to decision block 516

At block 512, the remote server manipulates the multi-dimensional fabric display interface based on the user input. In some embodiments, the manipulated display interface may include displaying specific content selected by the user. In other embodiments, the manipulated display interface may show a different section or area of the multi-dimensional fabric user interface based on the user input.

Process 500 proceeds next to block 514, where the remote server transmits the manipulated display interface to the display device. Process 500 continues next at decision block 516, where a determination is made whether the authentication of the personal mobile computing device has terminated. In some embodiments, the display device transmits a termination request to the remote server when the user of the personal mobile computing device walks away from or is out of range of the display device. If the authentication is terminated, process 550 terminates or otherwise returns to a calling process to perform other action; otherwise, process 500 loops to decision block 510 to receive additional user input from the display device.

Figure 5:
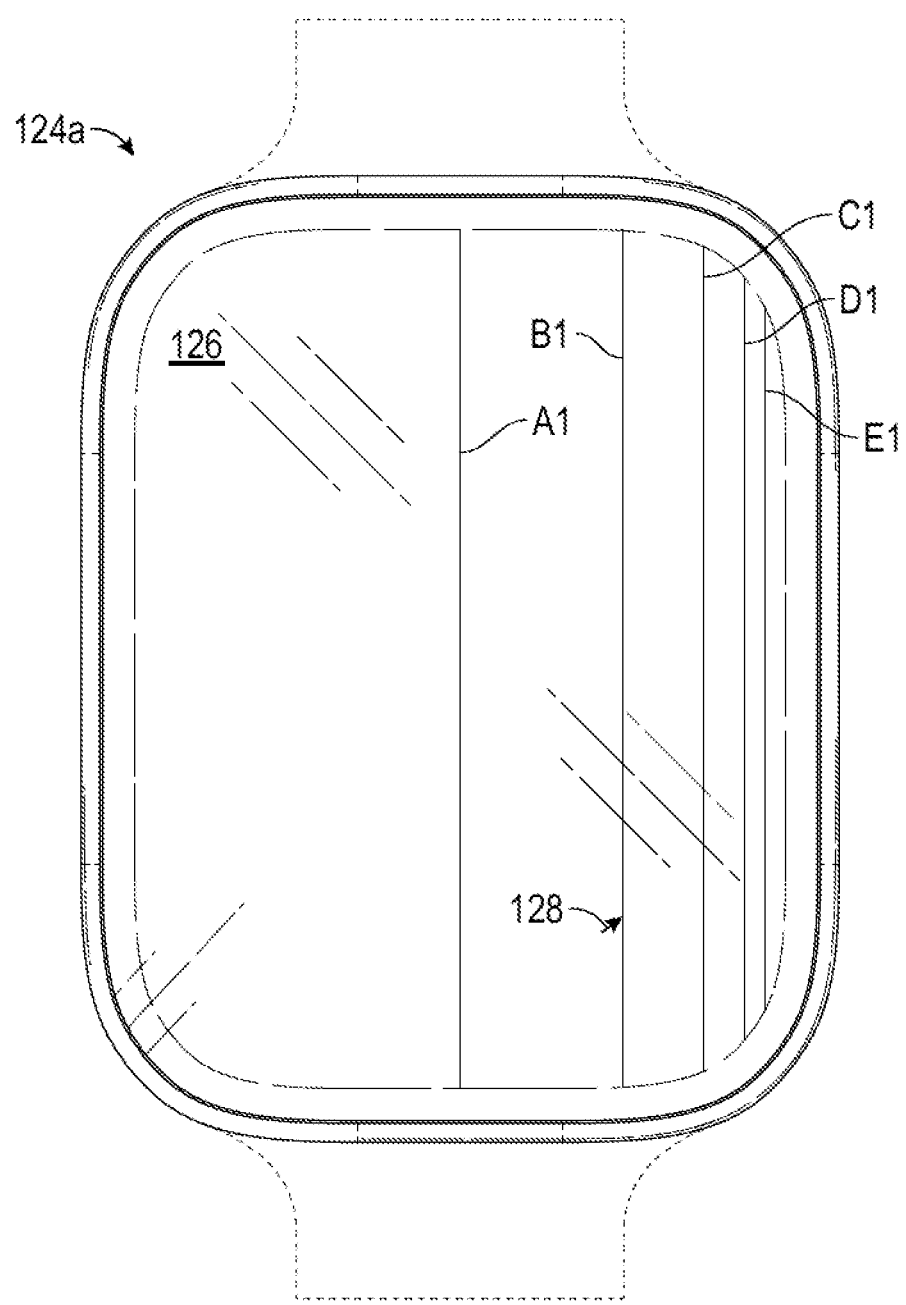
FIG. 5 illustrates a personal display device with a touch screen to receive user input.
Figure 6:
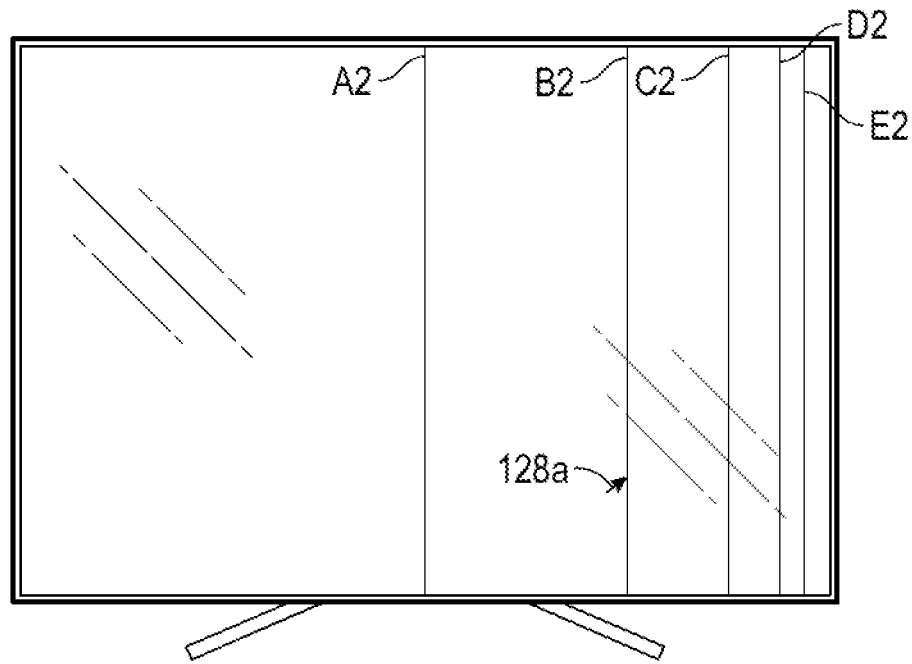
FIG. 6 illustrates a larger display device that is receiving cursor movement information.
Figure 7:
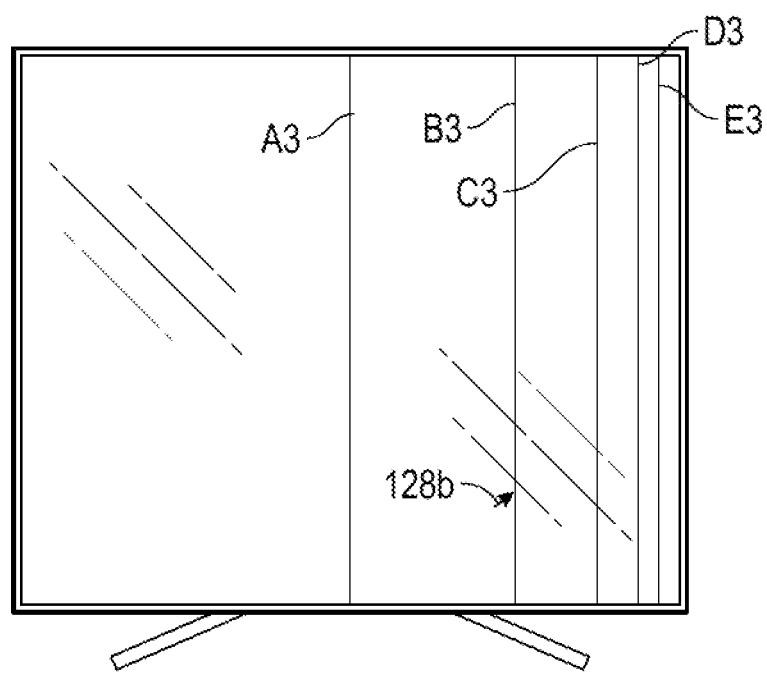
FIG. 7 illustrates a large display device that is receiving cursor movement information.

Referring now to FIGS. 5, 6, and 7, the system displays a user interface that may be accessed by a user having a processor-based personal computing device, such as a computer, smart phone, smart watch, or the like, such as the personal mobile computing devices 124 or display devices 108 shown in FIG. 1. Specifically, FIG. 5 shows a personal mobile computing device 124, FIG. 6 shows a larger screen display device 108*a*, and FIG. 7 shows a large screen display device 108*b* (but one that is smaller than the larger screen display device 108*a* of FIG. 6).

Some embodiments of a system and method for controlling cursor movement on an associated large display device 108*a*, 108*b* using dynamic grid density of the grid lines on the touch screen 126 of an associated personal mobile computing device 124*a* are described below. Some such cursor movement control systems include a remote server 102 and a personal mobile computing device 124 with a touch screen 126 that has a dynamic grid density that increases towards the edges of the touch screen. The gird density of the grid lines on the personal mobile computing device refers to how close the grid lines are to each other for sensing the location of the touch input from a user. As the grid lines are closer to each other, the density is greater. Having a dynamic grid density for the touch screen grid means that the density of the touch screen grid can vary over time, based on the location on the display and/or based on changes of the input to the touch screen 126 of the personal associated display. The grid density is thus dynamic, namely it can vary based on the various conditions. In this manner, movement of the cursor 128 on the touch screen 126 of the personal mobile computing device 124*a* translates into a larger corresponding movement on the associated large display devices 108*a*, 108*b* depending on how close the cursor is to the edge of the touch screen 126.

The associated large display device also includes a dynamic grid density for displaying the location of the cursor. The grid density of the associated display device refers to the density of the grid lines for showing the location of a cursor on the screen or other objects on the display. As grid lines for showing displayed location get closer to each other, the density increases on the associated large display. Having a dynamic grid density means that the density of the grid can vary based on a number of different factors, for example, it can vary over time, based on a location on the display and/or based on changes of the input to the associated display. Thus, there is also a dynamic grid density for the associated large display device, but it is based on the display location of the large display. The large display is not a touch sensing display in one embodiment; in another embodiment it also contains a touch sensing grip with touch sensing capability. If the large display includes a touch sending grid, this will be different from its dynamic display grid.

Accordingly, movements of the cursor 128 that are closer to the edge of the touch screen 126 of the personal mobile computing device 124a correspond to large associated movements of the cursors 128a, 128b on the associated large display devices 108a, 108b, and movements of the cursor 128a that are closer to the center of the touch screen 126 of the personal mobile computing device 124acorrespond to large associated movements of the cursors 128a, 128b on the associated large display devices 108a, 108b.

In some embodiments of the system and method for controlling cursor movement on an associated large display device 108a 108b using dynamic grid density on the touch screen 126, the personal mobile computing device 124a stores authentication information, includes a device memory that stores device computer instructions, and further includes a device processor that executes the stores device computer instructions. The device processor and device memory are described below in further detail with respect to FIG. 9.

The device processor executes the device computer instructions and causes the personal mobile computing device 124a to determine when it is within range of an associated large display device 108a or 108b. This may be performed using Wi-Fi, Bluetooth, Near Field Communication, or other appropriate sensing or communication technology. Next, the device processor executes further device computer instructions and causes the personal mobile computing device 124a to coordinate authentication between the personal mobile computing device and the remote server 102. In this manner, the system enables the personal mobile computing device 124a to link or pair with one of multiple different associated large display device 108a or 108b that do not need to have a pre-configured connection.

Once the personal mobile computing device 124a and one of the associated large display devices 108a or 108b are connected, via the remote server 102, the user may then submit user input, via the touch screen 126 of the personal mobile computing device 124a, to control cursor movement on the associated large display device 108a or 108b. As described in further detail below, the touch screen includes a grid (with grid lines that may or may not be visible) that increase in density towards the edges of the touch screen 126. The user input submitted by the user is then transmitted, via the above established connection, to the remote server 102 that calculates the cursor movement on the associated large display device 108a or 108b.

In some embodiments of the system and method for controlling cursor movement on an associated large display device 108a or 108b using dynamic grid density on the touch screen 126, the remote server 102 includes a server memory that stores device computer instructions, and includes a server processor that executes the stored server computer instructions. The server processor and server memory are described below in further detail with respect to FIG. 9.

The server processor executes the server computer instructions and causes the remote server 102 to calculate corresponding cursor movement on the associated large display device 108a or 108b using dynamic grid density on the touch screen 126 of the personal mobile computing device 124a that increases in density towards an edge of the touch screen. The dynamic grid density on the personal mobile computing device 124a controls how far the cursor 128a or 128b on the associated large display device 108a or 108b moves in response to the user input moving the cursor 128 on the touch screen 126 of the personal mobile computing device 124a. Once the corresponding movement of the cursor 128a or 128b on the associated large display device 108a or 108b has been calculated, the remote server 102 sends instructions to move the cursor 128a or 128b on the associated large display device 108a or 108b according to the calculated corresponding cursor movement.

Notably, in some embodiments of the system and method for controlling cursor movement on an associated large display device 108a or 108b using dynamic grid density on the touch screen 126, the corresponding cursor movement is calculated using the dynamic grid density without using a screen size of the associated large display device 108a or 108b in the calculation. In this manner, since the movement of the cursor 128 is characterized as a percentage of distance moved to the next grid line (e.g., from A1 to B1, from A2 to B2, etc.), rather than being characterizing in absolute distance (e.g., mm), the screen size does not need to be known by the personal mobile computing device 124a (or remote server) when the instructions for cursor movement are sent. For example, in response to the cursor 128 on the touch screen 126 of the personal mobile computing device 124a being moved 90% of the distance from grid line Al to grid line B1, instructions may be sent to move the cursor 128a on the large screen of the associated large display devices 108a 90% of the distance from grid line A2 to grid line B2.

In FIGS. 5, 6, and 7, five grid lines (i.e., A1, B1, C1, D1, and E1) can be seen on the touch screen 126 of the personal mobile computing device 124a and on the associated large display devices 108a, namely grid lines (i.e., A2, B2, C2, D2, and E2), and 108b grid lines (i.e., A3, B3, C3, D3, and E3). The first grid lines A2 and A3 are at the centerlines of the associated large display devices 108a, 108b, respectively. In this embodiment, each consecutive grid line (i.e., the second, third, fourth, and fifth grid line) are spaced at half of the remaining distance to the edge of the touch screen 126 and associated large display devices 108a, 108b. Thus, the grid density at E1, E2, and E3 is larger than the grid density at C1, C2, and C3. Additionally, the grid density at C1, C2, and C3 is larger than the grid density at A1, A2, and A3. Since the consecutive grid lines are each positioned half of the remaining distance to the edge of the personal mobile computing device 124a or associated large display devices 108a, 108b, this increasing grid line (or bounding box when in both vertical and horizontal directions) density alleviates problems with a user accidentally going off of the edge of the touch screen 126 with his or her finger or other input device. In some embodiments, these grid lines are not visible to a user of the system, while in other embodiments, the grid lines are visible to a user of the system.

While only vertical grid lines are shown on the respective personal mobile computing device and associated large display devices, horizontal grid lines are present on each device, both for the touch screen and the display screen, but are not shown for ease viewing the figures. Thus, the description and figures with respect to the vertical grid lines also applies to the horizontal grid lines that are present on each of the respective displays.

In some embodiments, the user may control the opacity of the grid lines so that they are visible enough to be useful for improved cursor movement purposes but not so visible that they are distracting from the information or content being displayed on touch screen 126 and associated large display devices 108*a*, 108*b*. Additionally, the dynamic grid density may vary between different embodiments of the system, with the grid line density being denser in some embodiments and less dense in other embodiments. Furthermore, while the grid lines of the touch screen (which represent dynamic grid density) are only shown in one direction in FIGS. 5, 6, and 7, in other embodiments, the grid lines are shown in two opposing directions (e.g., left and right, or top and bottom). In still other embodiments, the grid lines are shown in four directions (e.g., left, right, top, and bottom).

When the grid lines are shown in four directions, then the horizontal and vertical lines form bounding boxes. In some such embodiments, when the cursor is near the first grid line, which is a center line of a screen, then there are four bounding boxes. Next, in some such embodiments, when the cursor is near the grid line 2, which is half the distance to the edge of a screen in the embodiments of FIGS. 5, 6, and 7, then there are sixteen bounding boxes. In this manner, the movement of the cursor 128 on the touch screen 126 of the personal mobile computing device 124*a* moves the same percentage distance in a bounding box on the touch screen 126 of the personal mobile computing device 124*a* as a cursor 128*a* in a corresponding bounding box on the associated large display devices 108*a*. This increase in the number of bounding boxes continues for each additional grid line, as shown in FIGS. 5, 6, and 7, (e.g., 64 bounding boxes at grid line 3, 256 bounding boxes at grid line 4, and the like).

By looking at the movement of the cursor 128 on the touch screen 126 of the personal mobile computing device 124*a* (see grid line 2 on 126), and the corresponding movements of the cursors 128*a*, 128*b* on the associated large display devices 108*a*, 108*b* (see grid line 2 on 108*a* and 108*b*), it can be seen that the cursor movement on the associated large display devices 108*a* is the largest since that screen is the largest, and the cursor movement correlates to screen size in this embodiment of the system. For example, in some embodiments, a 5 mm movement on the touch screen 126 of the personal mobile computing device 124*a* from grid line A1 to grid line B1 translates to a 25 mm movement on the larger screen of the associated large display devices 108*a* from grid line A2 to grid line B2. Whereas, a 0.625 mm movement on the touch screen 126 of the personal mobile computing device 124*a* from grid line from grid line D1 to grid line E1 translates to a 3.125 mm movement on the larger screen of the associated large display devices 108*a* from grid line D2 to grid line E2. In this embodiment, A1-B1 is 5 mm, B1-C1 is 2.5 mm, C1-D1 is 1.25 mm, and D1-E1 is 0.625 mm while A2-B2 is 25 mm, B2-C2 is 12.5 mm, C2-D2 is 6.25 mm, and D2-E2 is 3.125 mm.

In other embodiments of the system, the cursor movement does not correlate directly to screen size, but still relates to larger cursor movements on larger screens and relates to smaller cursor movements on smaller (but still large) screens, in comparison to the touch screen 126 of the personal mobile computing device 124*a*.

In some embodiments of the system and method for controlling cursor movement on an associated large display device 108*a* or 108*b* using dynamic grid density on the touch screen 126, the larger associated large display devices 108*b* have a higher dynamic grid density toward edges of their touch screens than smaller associated large display devices 108*a*. In other embodiments, the smaller associated large display devices 108*a* have a lower dynamic grid density toward their edges than larger associated large display devices 108*b*. In another aspect of some embodiments of the system, the user's input device is one of a finger, a stylus, a digital pen, or other input device, that the user utilizes to submit cursor control movements into his or her touch screen 126 to control cursor movements on connected larger associated large display devices 108*a* or 108*b*.

In one or more embodiments of the system, the touch screen 126 of the personal mobile computing device 124*a* has four edges and the dynamic grid density increases from a center of the touch screen 126 towards any of the four edges of the touch screen 126. In some other embodiments, while the touch screen 126 of the personal mobile computing device 124*a* still has four edges, the dynamic grid density increases from a center of the touch screen 126 towards only two of the four edges of the touch screen 126. In one aspect, some embodiments of the system and method have a dynamic grid density that increases linearly from the center of the touch screen 126 towards one or more edges of the touch screen 126. In another aspect, some embodiments of the system and method have a dynamic grid density that increases geometrically from the center of the touch screen 126 towards one or more edges of the touch screen 126, namely, based on a geometric progression, while other embodiments of the system and method have a dynamic grid density that increases exponentially from the center of the touch screen 126 towards one or more edges of the touch screen 126.

In still another aspect of some embodiments, the received input from the user is sent from the personal mobile computing device 124*a* to the remote server 102 where the input is processed in association with the dynamic grid density. In some such embodiments, the instructions to move the cursor on the associated large display device 108*a* or 108*b* relative to the calculated corresponding cursor movement are then sent from the remote server 102 to the associated large display device 108*a* or 108*b*. Thus, in such embodiments of the system and method for controlling cursor movement, the corresponding cursor movement is calculated using the dynamic grid density without using a screen size of the associated large display device 108*a* or 108*b* in the calculation. Otherwise stated, in some embodiments, the personal mobile computing device 124*a* does not need to know the screen size of the associated large display device 108*a* or 108*b* in order to send appropriate cursor movement control signals to it with the touch screen 126 of the personal mobile computing device 124*a*.

Figure 8:
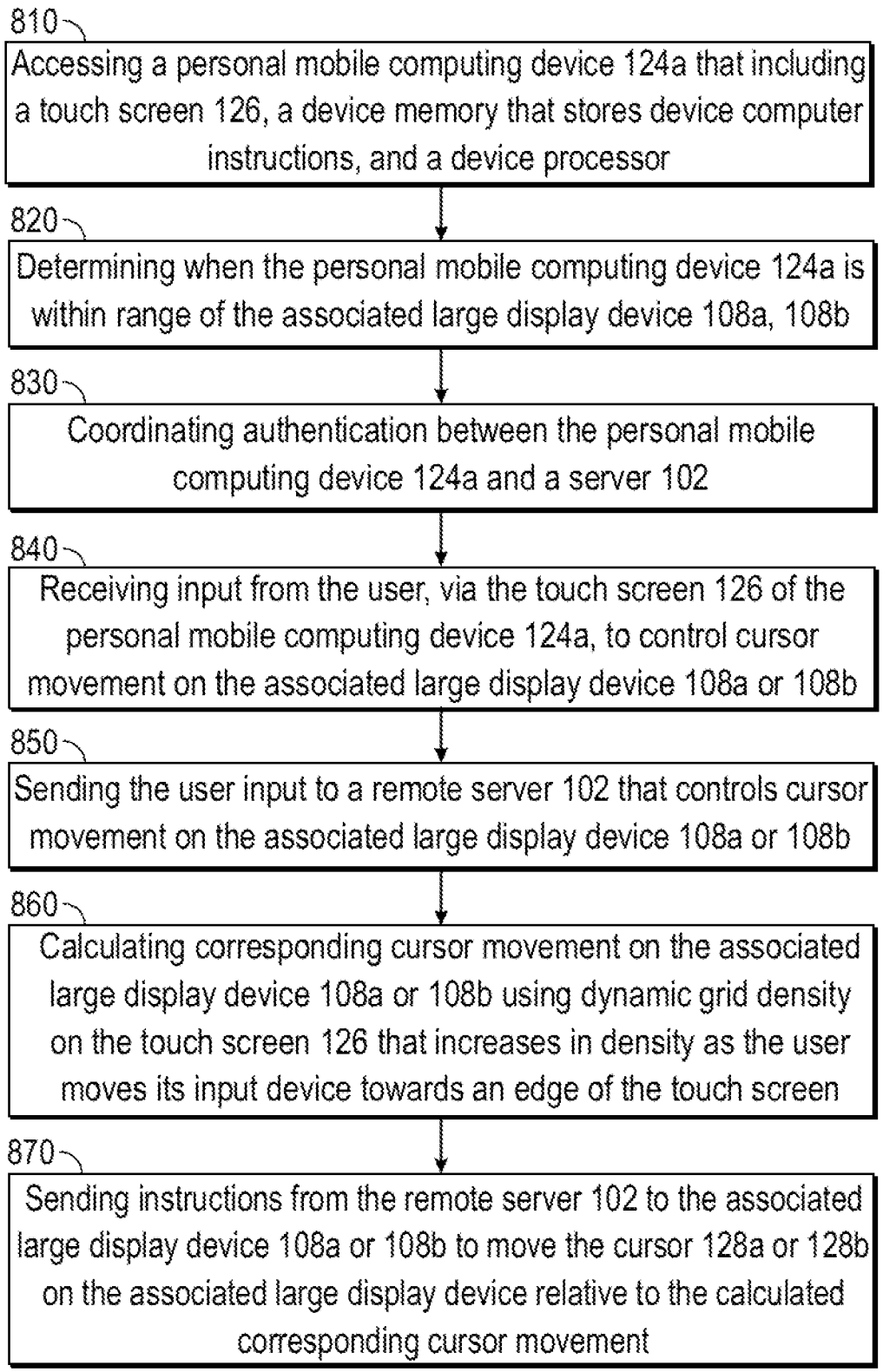
FIG. 8 illustrates a logic diagram that displays a process for receiving user input on a touch screen with dynamic grid density and uses this input to coordinate cursor movement on an associated larger display device.

Embodiments of the present disclosure are also directed towards methods for controlling cursor movement on an associated large display device 108*a* or 108*b* using dynamic grid density of the touch screen 126 on an associated personal mobile computing device 124*a*. As shown in FIG. 8, one such method includes: at 810, accessing a personal mobile computing device 124*a* that stores authentication information, the personal mobile computing device including a touch screen 126, a device memory that stores device computer instructions, and a device processor. Next at 820, the method recites, determining when the personal mobile computing device 124*a* is within range of the associated large display device 108*a*, 108*b*. Then at 830, the method includes coordinating authentication between the personal mobile computing device 124*a* and a remote server 102.

Continuing, at 840, the method recites receiving input from the user, via the touch screen 126 of the personal mobile computing device 124*a*, to control cursor movement on the associated large display device 108*a* or 108*b*, the touch screen including a grid that increases in density towards the edges of the touch screen 126. Next, at 850, the method further includes sending the user input to a remote server 102 that controls cursor movement on the associated large display device 108a or 108b.

Additionally, at 860, the method recites: calculating, using the remote server 102, corresponding cursor movement on the associated large display device 108a or 108b using dynamic grid density on the touch screen 126 of the personal mobile computing device 124a that increases in density as the user moves its input device towards an edge of the touch screen. The dynamic grid density on the personal mobile computing device 124a controls how far the cursor 128a or 128b on the associated large display device 108a or 108b moves in response to the user input on the touch screen 126 of the personal mobile computing device 124a.

Finally, at 870, the method also includes sending instructions from the remote server 102 to the associated large display device 108a or 108b to move the cursor 128a or 128b on the associated large display device 108a or 108b relative to the calculated corresponding cursor movement. The corresponding cursor movement is calculated using the dynamic grid density without using a screen size of the associated large display device 108a or 108b in the calculation. In this manner, since the movement of the cursor 128 is characterized as a percentage of distance moved to the next grid line (e.g., from C1 to D1, from C2 to D2, etc.), rather than being characterizing in absolute distance (e.g., mm), the screen size does not need to be known by the personal mobile computing device 124a (or remote server) when the instructions for cursor movement are sent. For example, in response to the cursor 128 on the touch screen 126 of the personal mobile computing device 124a being moved 70% of the distance from grid line C1 to grid line D1, instructions may be sent to move the cursor 128b on the large screen of the associated large display devices 108b 70% of the distance from grid line C2 to grid line D2.

In some other embodiments of the method for controlling cursor movement on an associated large display device 108a or 108b using dynamic grid density on the touch screen 126, some of the operations described above are removed from the process. For example, in some embodiments, operations 820 and 830 are removed from the process because these authentication techniques are not implemented by these embodiments. In still other embodiments of the method for controlling cursor movement on an associated large display device 108a or 108b using dynamic grid density on the touch screen 126, other operations in addition to those described above are added to the process.

In other embodiments of the system and method for controlling cursor movement on an associated large display device 108a or 108b using dynamic grid density on the touch screen 126, the personal mobile computing devices 124 are able to send cursor movement control information directly to the associated large display device 108a or 108b for controlling cursor movement on the associated large display device, instead of being sent to the remote server 102 for cursor control movement calculation and retransmission. In such an embodiment, the calculation of the cursor control movement is performed by the processor of the personal mobile computing devices 124, instead of the server processor of the remote server 102. This alternate embodiment may be needed in certain situations, such as by way of example only, and not by way of limitation, such as (1) situations where there is no Wi-Fi are other transmission means available for connecting with the remote server 102, (2) situations where the transmission latency transmitted to the remote server 102 and then back to the associated large display device 108a or 108b is unacceptably large for the current application or use case, and (3) situations where there are security advantages from using a direct transmission from the personal mobile computing devices 124 to the associated large display device 108a or 108b.

Figure 9:
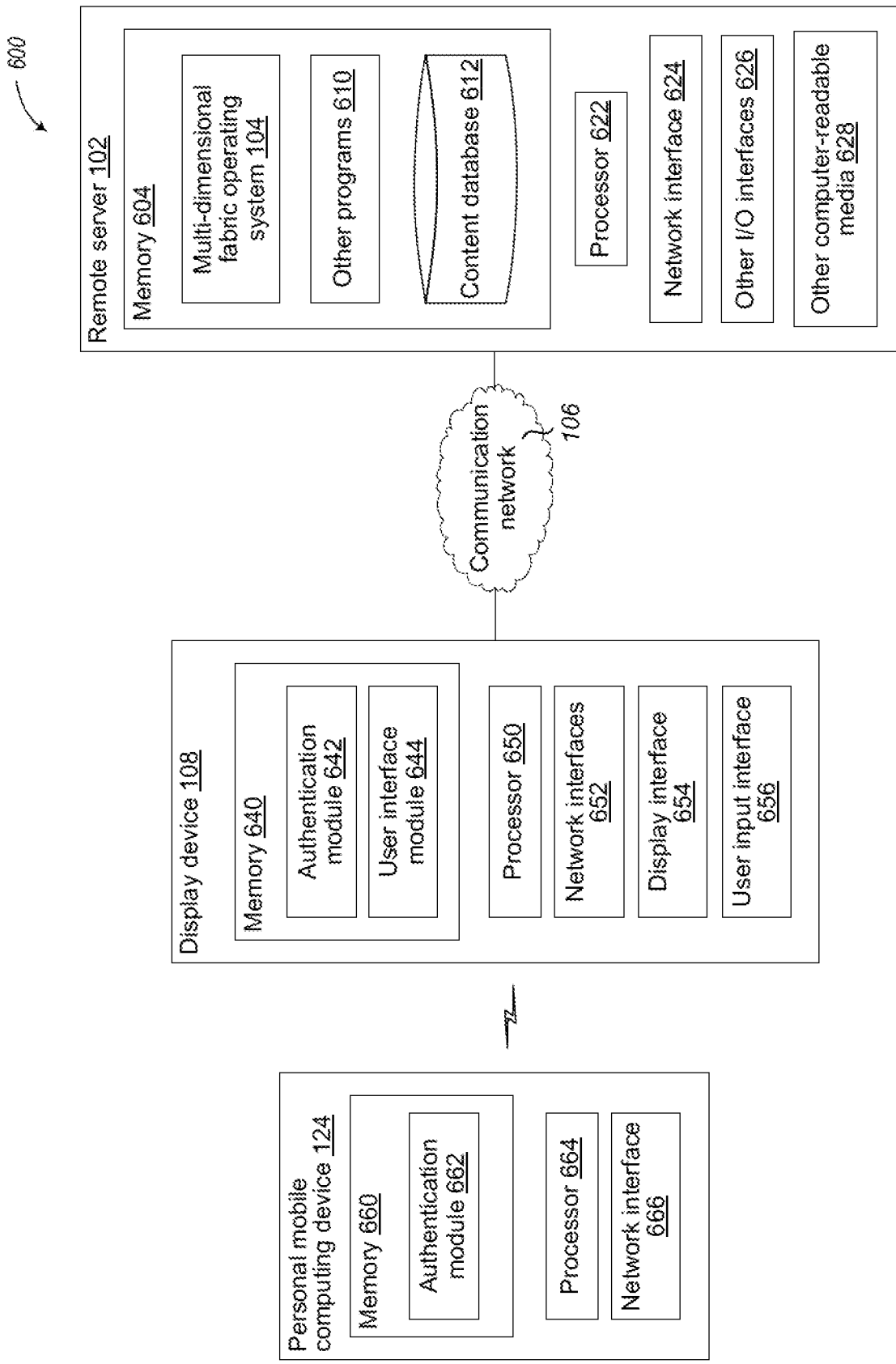
FIG. 9 illustrates a system diagram that describes one implementation of computing systems for implementing embodiments described herein.

FIG. 9 shows a system diagram that describes one implementation of computing systems for implementing embodiments described herein. System 600 includes remote server 102, one or more associated large display devices 108a and 108b, and one or more personal mobile computing devices 124.

As described herein, the remote server 102 is a computing device that can perform functionality described herein for implementing an operating system that provides a multi-dimensional fabric user interface for storing content. One or more special purpose computing systems may be used to implement the remote server 102. Accordingly, various embodiments described herein may be implemented in software, hardware, firmware, or in some combination thereof. The remote server 102 includes memory 604, one or more processors 622, network interface 624, other input/output (I/O) interfaces 626, and other computer-readable media 628. In some embodiments, the remote server 102 may be implemented by cloud computing resources.

Processor 622 includes one or more processing devices that execute computer instructions to perform actions, including at least some embodiments described herein. In various embodiments, the processor 622 may include one or more central processing units ("CPU"), programmable logic, or other processing circuitry.

Memory 604 may include one or more various types of non-volatile and/or volatile storage technologies. Examples of memory 604 include, but are not limited to, flash memory, hard disk drives, optical drives, solid-state drives, various types of random-access memory ("RAM"), various types of read-only memory ("ROM"), other computer-readable storage media (also referred to as processor-readable storage media), other memory technologies, or any combination thereof. Memory 604 may be utilized to store information, including computer-readable instructions that are utilized by processor 622 to perform actions, including at least some embodiments described herein.

Memory 604 may have stored thereon multi-dimensional fabric operating system 104. The multi-dimensional fabric operating system 104 authenticates users of personal mobile computing devices 124 via display devices 108 and provides a user interface of a multi-dimensional fabric for storing and accessing content, as described herein.

Memory 604 may include a content database 612 for storing content in accordance with the multi-dimensional fabric user interface. Memory 604 may also store other programs 610. The other programs 610 may include other operating systems, user applications, or other computer programs that are accessible to the personal mobile computing device 124 via the display device 108.

Network interface 624 is configured to communicate with other computing devices, such as the display devices 108, via a communication network 106. Network interface 624 includes transmitters and receivers (not illustrated) to send and receive data associated with the multi-dimensional fabric user interface described herein.

Other I/O interfaces 626 may include interfaces for various other input or output devices, such as audio interfaces, other video interfaces, USB interfaces, physical buttons, keyboards, haptic interfaces, tactile interfaces, or the like. Other computer-readable media 628 may include other types of stationary or removable computer-readable media, such as removable flash drives, external hard drives, or the like.

The display devices 108 are computing devices that are remote from the remote server 102. In some embodiments, the display devices 108 may include one or more computing devices and display devices. The display devices 108 coordinate authentication between the personal mobile computing devices 124 and the remote server 102. The display devices 108 receive input from the users of the personal mobile computing device 124 and provide the input to the remote server 102. The display devices 108 receive the graphical user interfaces for the multi-dimensional fabric user interface to be presented to the users of the personal mobile computing devices 124.

One or more special-purpose computing systems may be used to implement the display devices 108. Accordingly, various embodiments described herein may be implemented in software, hardware, firmware, or in some combination thereof.

The display devices 108 include memory 640, one or more processors 650, network interface 652, display interface 654, and user input interface 656. The memory 640, processor 650, and network interface 652 may be similar to, include similar components, or incorporate embodiments of memory 604, processor 622, and network interface 624 of remote server 102, respectively. Thus, processor 650 includes one or more processing devices that execute computer instructions to perform actions, including at least some embodiments described herein. In various embodiments, the processor 650 may include one or more CPUs, programmable logic, or other processing circuitry. The network interfaces 652 is also configured to communicate with the personal mobile computing devices 124, such as via Bluetooth or other short-range communication protocol or technology.

Memory 640 may include one or more various types of non-volatile and/or volatile storage technologies. Memory 640 may be utilized to store information, including computer-readable instructions that are utilized by processor 650 to perform actions, including at least some embodiments described herein. Memory 640 may store various modules or programs, including authentication module 642 and user interface module 644. The authentication module 642 may perform actions that coordinate the authentication between the personal mobile computing devices 124 and the remote server 102. The user interface module 644 receives graphical user interface data from the remote server 102 for display or presentation, via the display interface 654, to the user of the personal mobile computing devices 124. The user interface module 644 also receives user input via the user input interface 656 and provides that input back to the remote server 102. In various embodiments, one or more capacitive, radar, infrared, LIDAR, or other type of gesture capturing sensors may be used to receive the user input. In some other embodiments, the user interface module 644 may receive user inputs via other input mechanisms, such as a mouse, stylus, voice-recognition, or other input sensors. Memory 640 may also store other programs.

The personal mobile computing devices 124 are computing devices that are remote from the display devices 108 and the remote server 102. When a personal mobile computing device 124 is within a threshold range of the display device 108 or when a user of the personal mobile computing device 124 activates authentication, the personal mobile computing device 124 provides authentication data or information to the display device 108 for forwarding to the remote server 102. In various embodiments, the personal mobile computing device 124 is separate from the display device 108, such that a user can walk up to a display device 108 with the personal mobile computing device 124 to initiate the process described herein to have the display device 108 present the user interface of the multi-dimensional fabric received from the remote server 102. The user can then provide input to the display device 108, such as with hand gestures or arm movement, to manipulate the multi-dimensional fabric user interface and select content for display.

One or more special-purpose computing systems may be used to implement the personal mobile computing devices 124. Accordingly, various embodiments described herein may be implemented in software, hardware, firmware, or in some combination thereof.

The personal mobile computing devices 124 include memory 660, one or more processors 664, and a network interface 666. The memory 660, processor 664, and network interface 666 may be similar to, include similar components to, or incorporate embodiments of memory 640, processor 650, and network interfaces 652 of display devices 108, respectively. Thus, processor 664 includes one or more processing devices that execute computer instructions to perform actions, including at least some embodiments described herein. In various embodiments, the processor 664 may include one or more CPUs, programmable logic, or other processing circuitry. The network interface 666 is configured to communicate with the display devices 108, but not with the remote server 102.

Memory 660 may include one or more various types of non-volatile and/or volatile storage technologies. Memory 660 may be utilized to store information, including computer-readable instructions that are utilized by processor 650 to perform actions, including at least some embodiments described herein.

Memory 660 may store various modules or programs, including authentication module 662. The authentication module 662 may perform actions to communicate authentication information to a display device 108 when within a threshold distance from the display device or when activated by a user.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

The invention claimed is:

1. A system for controlling cursor movement comprising:
a personal mobile computing device that stores authentication information, the personal mobile computing device including a touch screen, a device memory that stores device computer instructions, and a device processor that when executing the device computer instructions causes the personal mobile computing device to:
determine when the personal mobile computing device is within range of an associated large display device;
coordinate authentication of use of the associated large display device between the personal mobile computing device and a server;
receive input from a user via the touch screen of the personal mobile computing device to control cursor movement on the associated large display device, the touch screen including a grid that increases in density towards edges of the touch screen, the associated large display device also including a dynamic grid that increases in density towards edges of the associated large display device, wherein the touch screen of the personal mobile computing device has a higher grid density than the associated large display device; and send the user input to a remote server that controls cursor movement on the associated large display device;

the remote server includes a server memory that stores server computer instructions and a server processor that when executing the server computer instructions causes the remote server to:

calculate corresponding cursor movement on the associated large display device using dynamic grid density on the touch screen of the personal mobile computing device that increases in density as the user moves an input device of the personal mobile computing device towards an edge of the touch screen, wherein movement of the cursor with respect to the dynamic grid density of the personal mobile computing device controls corresponding cursor movement with respect to the dynamic grid density of the associated large display device, in response to the user input on the touch screen of the personal mobile computing device; and send instructions to move the cursor on the associated large display device relative to the calculated corresponding cursor movement, wherein the corresponding cursor movement is calculated using the dynamic grid density of the associated large display device.

2. The system of claim 1, wherein a larger associated large display device has a lower dynamic grid density toward an edge of its touch screen than a smaller associated large display device.

3. The system of claim 1, wherein a smaller associated large display device has a lower dynamic grid density toward an edge of its display screen than larger associated large display devices.

4. The system of claim 1, wherein the user's input device is one of a user's finger, a stylus, or a digital pen.

5. The system of claim 1, wherein the touch screen has four edges and the dynamic grid density increases from a center of the touch screen towards any of the four edges.

6. The system of claim 1, wherein the touch screen has four edges and the dynamic grid density increases from a center of the touch screen towards only two of the four edges.

7. The system of claim 1, wherein the dynamic grid density increases geometrically from a center of the touch screen towards an edge of the touch screen.

8. The system of claim 1, wherein the dynamic grid density increases exponentially from a center of the touch screen towards an edge of the touch screen.

9. The system of claim 1, wherein the received input from the user is sent from the personal mobile computing device to the server where the input is processed in association with the dynamic grid density.

10. The system of claim 1, wherein the instructions to move the cursor on the associated large display device relative to the calculated corresponding cursor movement are sent from the server to the associated large display device.

11. A method for controlling cursor movement comprising:

accessing a personal mobile computing device that stores authentication information, the personal mobile computing device including a touch screen, a device memory that stores device computer instructions, and a device processor;

receiving input from a user via the touch screen of the personal mobile computing device to control cursor movement on an associated large display device, the touch screen including a grid that increases in density towards edges of the touch screen, the associated large display device also including a grid that increases in density towards edges, wherein the touch screen of the personal mobile computing device has a higher grid density than the associated large display device due to their relative size;

sending the user input to a remote server that controls cursor movement on the associated large display device;

calculating, using the remote server, corresponding cursor movement on the associated large display device using dynamic grid density on the touch screen of the personal mobile computing device that increases in density as the user moves its input device towards an edge of the touch screen, wherein movement of the cursor with respect to the dynamic grid density of the personal mobile computing device controls corresponding cursor movement with respect to a dynamic grid density of the associated large display device, in response to the user input on the touch screen of the personal mobile computing device; and sending instructions from the remote server to the associated large display device to move the cursor on the associated large display device relative to the calculated corresponding cursor movement, wherein the corresponding cursor movement is calculated using the dynamic grid density without using a screen size of the associated large display device in the calculation.

12. The method of claim 11, wherein larger associated large display devices having higher dynamic grid density toward edges of their touch screens than smaller associated large display devices.

13. The method of claim 11, wherein smaller associated large display devices have lower dynamic grid density toward edges of their touch screens than larger associated large display devices.

14. The method of claim 11, wherein the touch screen has four edges and the dynamic grid density increases from a center of the touch screen towards any of the four edges.

15. The method of claim 11, wherein the touch screen has four edges and the dynamic grid density increases from a center of the touch screen towards only two of the four edges.

16. The method of claim 11, wherein the dynamic grid density increases geometrically from a center of the touch screen towards an edge of the touch screen.

17. The method of claim 11, wherein the dynamic grid density increases exponentially from a center of the touch screen towards an edge of the touch screen.

18. The method of claim 11, wherein the received input from the user is sent from the personal mobile computing device to the server where the input is processed in association with the dynamic grid density.

19. The method of claim 11, wherein the instructions to move the cursor on the associated large display device relative to the calculated corresponding cursor movement are sent from the server to the associated large display device.

20. A system comprising:
a personal mobile computing device that stores authentication information, the personal mobile computing device including a touch screen, a device memory that stores device computer instructions, and a device processor that when executing the device computer instructions causes the personal mobile computing device to:
receive input from a user via the touch screen of the personal mobile computing device to control cursor movement on an associated large display device, the touch screen including a grid that increases in density towards edges of the touch screen; and
send the user input to a remote server that controls cursor movement on the associated large display device;
the remote server includes a server memory that stores server computer instructions and a server processor that when executing the server computer instructions causes the remote server to:
calculate corresponding cursor movement on the associated large display device, wherein a dynamic grid density on the touch screen controls how far a cursor on the associated large display device moves in response to the user input on the touch screen; and
send instructions to move the cursor on the associated large display device using to the calculated corresponding cursor movement.

* * * * *